United States Patent Office 2,956,412
Patented Oct. 18, 1960

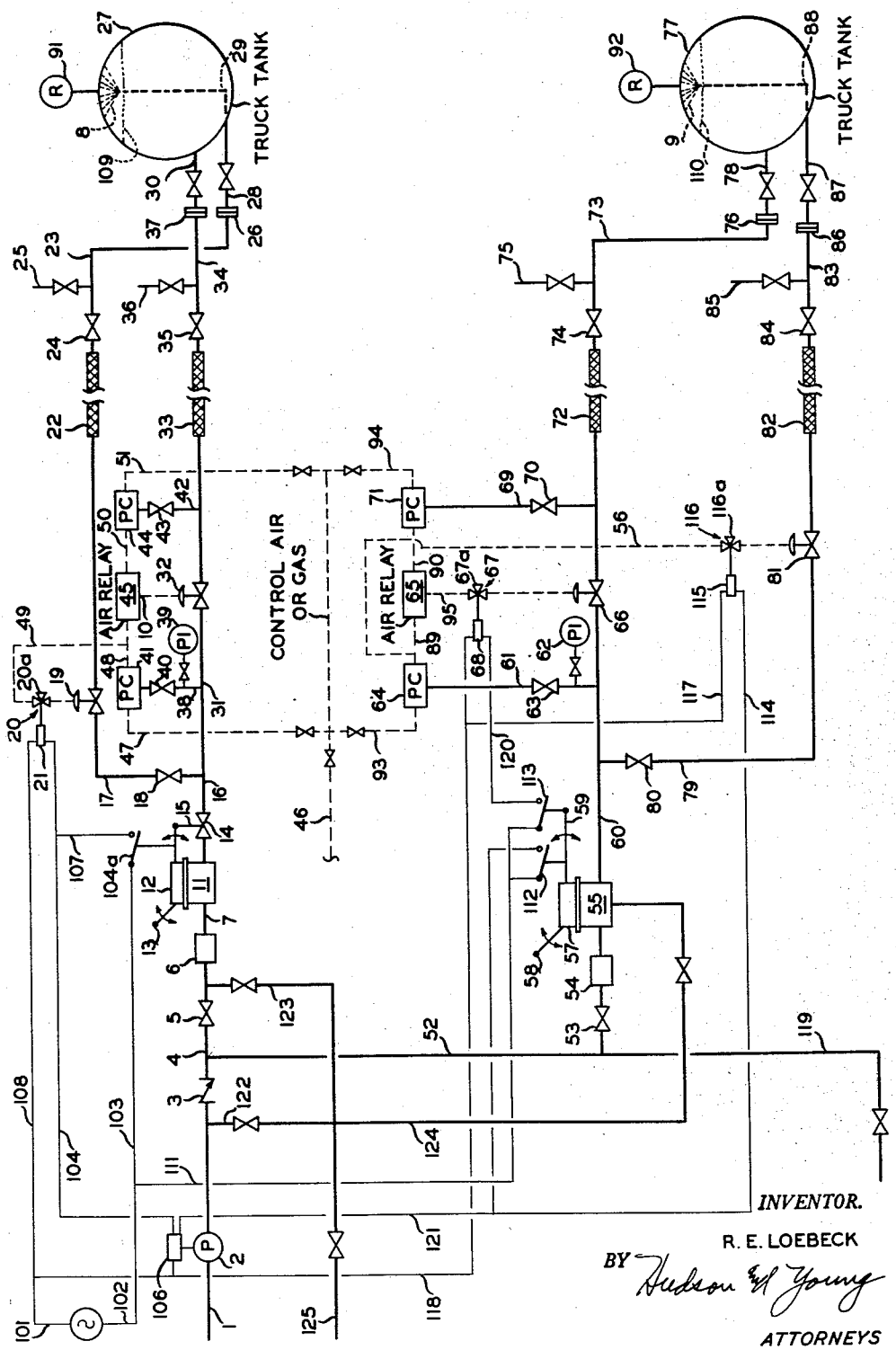

2,956,412
CONTROL SYSTEM FOR LOADING LIQUEFIED GAS

Robert E. Loebeck, Bartlesville, Okla., assignor to Phillips Petroleum Company, a corporation of Delaware Filed Jan. 5, 1959, Ser. No. 784,905

7 Claims. (Cl. 62—49)

This invention relates to apparatus for transferring a metered volume of liquefied gas to a closed container. In one aspect it relates to apparatus for transferring a metered volume of liquefied petroleum gas, as measured by positive displacement meters, to a closed container such as a transport truck. In another aspect it relates to such apparatus for use in loading transport trucks without need for a pressure equalizing line.

In some instances transport trucks which are used in liquefied petroleum gas transport service are equipped for spray loading. By the term "spray loading" is meant the provision of a relatively large liquid spray device disposed in the top of the transport tank so that liquefied petroleum gas, when pumped into the tank, is pumped through the spray for cooling so as not to build up high pressures as the liquid volume increases and the vapor is compressed. Such pumping equipment involves pipes and a pump for pumping the liquefied petroleum gas at the rate of from about 300 to 400 gallons per minute. When such transport trucks are not provided with spray equipment, a separate pipe is run from the top of the truck tank to the storage tank so that, as liquid is pumped into the bottom of the truck tank, vapors escape from the top of the truck tank and are transmitted through the pipe to the storage tank so that pressure does not build up in the truck tank and cause popping of the relief valve.

The vapor phase above the liquefied gas in truck tanks which are equipped with the top tank sprays is kept cool so as not to build up high pressures in the tank, and such tanks do not require a pressure equalization line leading from the truck tank back to the storage tank. Many liquefied petroleum gas (LPG) transport truck tanks are not equipped with such spray loading apparatus.

One important disadvantage in prior art methods of loading transport truck tanks with liquefied petroleum gas when using meters for measuring the volume of the liquid being loaded into the tank is that when the pressure equalization line is employed between the top of the transport tank and the storage tank, the amount of vapor passing from the truck tank to the storage tank is lost from the truck tank. In other words, the meters indicate that a larger volume of liquid is transferred to the truck tank than is actually in the tank. This volume difference is because a portion of the liquid has been returned as vapor to the storage tank through the pressure equalization line. In such cases, when the reading of the meter is used in the purchase and sale of a product, the amount of liquefied petroleum gas actually delivered may be less than that indicated by the meter.

To eliminate this inaccuracy, meters have been installed in the vapor return line and the volumes so recorded have been deducted from the amount of liquid delivered to the transport tank through the liquid meter. This system of metering obviously has many disadvantages. For example, a metered vapor volume cannot be deducted directly from a metered liquid volume, it first being necessary to compute the liquid equivalent of the metered vapor. Since pressure and temperature must be measured simultaneously before such calculations can be made, it is customary to use a pressure and temperature compensated meter to measure the volume of vapor, such a meter is very costly and therefore undesirable.

An object of this invention is to provide apparatus for loading liquefied petroleum gas into transport truck tanks. Another object is to provide apparatus for loading liquefied gas into containers. Another object of this invention is to provide apparatus for loading liquefied petroleum gas into transport truck tanks which are not equipped for spray loading and without need for the use of a pressure equalization line from the truck tank to the LPG supply tank. Yet another object is to provide such apparatus with which a positive displacement meter can be used for loading predetermined volumes of liquefied petroleum gas into truck tanks. Still other advantages will be realized upon reading the following description which, taken with the attached drawing, forms a part of this specification.

The drawing illustrates diagrammatically one form of apparatus for carrying out this invention.

I have devised apparatus for loading closed containers, which are not equipped for spray loading, with a liquefied gas wherein positive displacement meters are employed for measuring the volume of liquid transferred, and without the need for pressure equalization lines.

According to my invention, I provide a transfer pipe leading from the storage tank to the bottom fill inlet of the truck tank. This pipe is provided with a pump for the transfer of liquid and a positive displacement meter for volume measurement. The meter is placed on the discharge side of the pump. Connected with this transfer pipe at some point between the meter and the truck tank is the branch pipe which discharges to the top of the truck tank. I provide a flow control means in this branch pipe and also a flow control means in the transfer pipe between the bottom of the tank and the point at which the branch pipe communicates with the transfer pipe. I also provide valve control means for regulating these valves so as to make certain that liquid only is present in the meter at all times. These control means regulate the rate of flow of liquefied gas through the transfer pipe into the bottom of the truck tank and the rate of flow through the bypass line into the top of the tank. In this manner, I am able to regulate and control the temperature and accordingly the pressure within the transfer truck while the tank is being filled only with liquid.

When the transport truck is equipped for spray loading, there is a large spray connection at the top of the truck tank. Tanks so equipped may be loaded at the rate of from 300 to 400 gallons liquefied petroleum gas per minute without use of a pressure equalization line. Many presently used transport trucks are not equipped with these large sprays for spray loading.

In order to be able to use a positive displacement meter for measuring the liquid volume of liquefied petroleum gas being loaded into a transport truck, I use the main transfer pipe and the branch pipe as mentioned above. The major portion of the liquefied petroleum gas is passed through the transfer pipe into the bottom of the truck tank. As liquid enters the tank from the bottom, the volume occupied by the gas becomes smaller and smaller with the result that pressure in the tank increases. As is known from the gas laws, as pressure of a gas increases, temperature also increases, particularly when the pressure increase is rapid. In the loading of such liquefied petroleum gas at the rate of 300 to 400 gallons per minute, the temperature increase in the vapor phase in the truck tank is quite rapid. I reduce this temperature and accordingly the pressure by allowing a portion of the liquefied gas to pass through the bypass line and enter the top of the transport tank as a small spray. This spray addition of a portion of the liquid loaded into the tank cools the vapor content of the tank with the result that pressure therein is decreased. The flow regulators in the two pipes are actually throttle valves. The truck tanks are always provided with pressure relief valves in order to maintain safe working pressures within the tank. In the case of liquefied petroleum gas, relief valves are frequently set to release pressure at about 250 p.s.i.g. (pounds per square inch gauge). In order to prevent or eliminate undue popping of the relief valve, I set the throttle valve on the main transfer pipe to the bottom of the tank to close at a pressure of about 225 p.s.i.g. With this valve closed liquefied petroleum gas enters the truck tank only through the upper small spray thereby cooling the vapor content of the tank so the tank loading can be completed without popping of the relief valve.

After the main throttle valve in the botom fill pipe is closed, filling continues through the upper and smaller pipe in the form of a spray. Filling in this manner continues until the predetermined liquid volume of liquefied petroleum gas has been loaded into the tank as indicated by a setting on the positive displacement meter. Such a positive displacement meter is used as will automatically shut off all flow of liquid to the tank when the predetermined gallonage has been passed through the meter. At the same time the transfer pump is turned off. My system involves apparatus for loading two or more truck tanks at the same time with the loading pump remaining in operation as long as any one of the tanks being filled has not as yet received its predetermined gallonage of liquid.

In the drawing, reference numeral 1 identifies a pipe for passage of liquefied petroleum gas from a source, not shown, to my truck loading system. Pipe 1 is provided with a pump 2 for transferring this material. Pipe 1 branches into pipes 4 and 52 as shown. A check valve 3 is provided in pipe 1. In pipe 4 is installed a manually operable valve 5 and a strainer or filter 6. From filter 6 a pipe 7 leads to a positive displacement meter 11. This positive displacement meter 11 is provided with a set-stop mechanism 12 which is of the type that a gallonage of liquid to be metered is set on the set-stop apparatus and when that number of gallons has been metered the apparatus will close the valve or open or close a switch, as desired, to stop the pump. Leading from meter 11 is a pipe 16 provided with a valve 14 which is an on-off valve. Pipe 16 branches into pipe 17 and pipe 31, the former leading via connection 26 to pipe 28 at the bottom of a truck tank 27 while the later leads via connection 37 to pipe 30. Pipe 31 is provided with a normally closed throttle valve 32. Pipe 31 finally discharges into a flexible hose 33 which discharges into a pipe 34 provided with a manually operable valve 35. Pipe 34 is provided at its other end with one portion of a coupling 37. The other portion of the coupling 37 is carried by a valved pipe 30 on the tank. Pipe 34 is provided with a valved pipe 36 for bleed purposes. Pipe 17 is provided with a normally closed throttle valve 19 and with a manually operable valve 18 as illustrated. To pipe 17 downstream from throttle valve 19 as regards direction of liquid flow is attached a small diameter hose 22 followed by a pipe 23 provided with a valve 24, the end of this pipe being provided with one connection of a coupling 26. The other portion of coupling 26 is carried by a valved pipe 28 on the tank. A valved bleed pipe 25 is connected with pipe 23. Pipes 38 and 42 are connected to pipe 31 on opposite sides of throttle valve 32. Pipe 38 is provided with a manually operable valve 40 and a pressure indicator 39 while pipe 42 is provided with the manually operable valve 43. Pipe 38 communicates with a pressure controller 41 while pipe 42 communicates with a pressure controller 44 as illustrated. Pressure controllers 41 and 44 communicate with a selective air relay 45 by way of pipes 48 and 50. The air relay communicates directly with the motor of valve 32 by way of a pipe 10. Instrument air or such other gases desired from a source, not shown, enters the system by way of a pipe 46 and is distributed to pressure controller 41 and 44 by pipes 47 and 51, respectively. The motor of throttle valve 19 is connected with a 3-way solenoid valve 20. Reference numeral 20a identifies a vent from this 3-way valve. The 3-way valve communicates by way of a pipe 49 to pipe 48 for passage of instrument air. A solenoid 21 is provided for actuation of his 3-way solenoid valve 20.

Pipe 28 enters the bottom of truck tank 27 and is bent upward as a pipe 29 which leads to within a short distance of the top of the tank. Reference numeral 91 identifies a pressure relief valve in tank 27. Reference numeral 109 identifies the surface of liquid being loaded into tank 27.

Branch pipe 52 which also conducts liquefied petroleum gas for loading of a second truck tank simultaneously with the loading of the truck tank 27 is provided with a manually operable valve 53, a filter 54, and a positive displacement meter 55. This positive displacement meter is also of the set-stop type and is provided with a set-stop mechanism 57. To the discharge side of meter 55 is attached a pipe 60 which leads to a flexible hose 72. Pipe 60 is provided with a normally closed throttle valve 66. Hose 72 is also connected with a pipe 73 which is provided with a manually operable valve 74 and a valved bleed pipe 75. The opposite end of pipe 73 is provided with one portion of a connection for coupling 76, the other portion of the coupling being positioned on the valved pipe 78 at the bottom portion of tank 77. Pipes 61 and 69 communicate with pipe 60 on opposite sides of throttle valve 66. Pipe 61 is provided with the manually operable valve 63 and a pressure gauge 62 and with a pressure controller 64 as illustrated. Pipe 69 is provided with the manually operable valve 70 and a pressure controller 71. These pressure controllers communicate with a selective air relay 65 by way of a pipe 89 and a pipe 90, respectively. Controllers 64 and 71 communicate with pipe 46 by way of pipes 93 and 94, respectively. The air relay 65 communicates with a 3-way solenoid operated valve 67 by a pipe 95. One side of this solenoid valve communicates with the motor of the throttle valve 66 while the other side of the 3-way valve is a vent 67a. The solenoid 68 is disposed to actuate this 3-way valve.

A bypass pipe 79 is connected with pipe 60 at a point between meter 55 and a point of communication of pipe 61 and pipe 60. Pipe 79 is provided with a manually operable valve 80 and with a normally closed throttle valve 81 and terminates in a connection with a flexible hose 82. The other end of the flexible hose is connected with a pipe 83 which is provided with the manually operable valve 84 and a bleed pipe 85. The end of this pipe 83 is provided with one portion of a coupling 86 while the other portion of this coupling is attached to a valved pipe 87 which is the top filling pipe of the truck tank 77. Inside tank 77 this top fill pipe is bent upward as pipe 88 and leads up to within a short distance from the top of the tank as shown. Reference numeral 110 identifies the top of the liquid contents of the tank while reference numeral 9 identifies the small spray which is loaded into the tank through pipe 88. Reference numeral 92 identifies the pressure relief valve in tank 77.

Reference numerals 101 and 102 identify lead wires which provide electrical power from a source, not shown. Wire 101 branches into lead 108 which along with wires 107, switch 104a, and wire 103 provide a circuit to wire 102 for the operation of solenoid 21 of solenoid valve 20. Wires 108, 118, 120, switch 113, and wire 111 provide a circuit from wires 101 and 102 for the operation of solenoid 68. Wires 108, 118, 117, 114, switch 112, and wire 11 provides a circuit from wires 101 and 102 for operation of solenoid 115.

Linkage 15 operatively attached to the set-stop mechanism 12 of meter 11 actuates valve 14 from an open position to a closed position and vice versa. A hand lever 13 is provided for opening valve 14 and closing switch 104a by way of set-stop mechanism 12 and linkage 15.

A hand lever 58 connected with set-stop mechanism 57 of meter 55 is arranegd to actuate linkage 59 for closing switches 112 and 113 to start loading of truck tank 77. A 3-way valve 116 is attached to the motor of throttle valve 81 as illustrated, one side of this 3-way valve being connected by way of a pipe 56 to pipe 89 for transmission of operating air while reference numeral 116a identifies a bleed of this 3-way valve.

A pipe 119 is provided at the end of pipe 52 for passage of liquefied petroleum gas to additional meters and loading systems similar to those illustrated herein for loading tanks 77 and 27.

A small diameter pipe 122 is connected with feed pipe 1 and branches into valved pipes 123 and 124. Pipe 123 connects with pipe 4 at a point near the filter 6 and meter 11 while pipe 124 connects directly with meter 55. These several pipes are for the purpose of pressure equalization and also for venting gas from the feed pipes 4 and 52 and the filters and meters after the liquefied gas has been admitted thereto. Gas vented from these members leaves the system through pipe 123 and pipe 124 and exits through vent pipe 125. After this venting the truck loading operation is then ready to begin. Because of the high vapor pressure of such material as liquefied petroleum gas, upon opening of valves from the storage zone the liquid flows through pipe 1, pump 2, check valve 3, pipes 4 and 52 to the corresponding filters and meters, even before pump 2 has been placed in operation. It is during this time that the valves in pipes 123, 124, and 125 are opened with valve in pipe 122 being closed to flush all gases from this system up to and including meters 11 and 55.

With liquid flowing through pipe 1, pump 2, check valve 3, pipe 4, valve 5, filter 6, pipe 7, to meter 11, upon pushing downward on hand lever 13, linkage 15 is actuated to close switch 104a and to open valve 14. Upon closing switch 104a a circuit is completed from 102, through 103, switch 104a being closed, through 107, 104 and the motor starter 160 thereby placing pump 2 in operation and liquefied petroleum gas is supplied to the system under operating pressure. As mentioned hereinbefore, throttle valves 19 and 32 are normally closed valves so that when the system is not in operation these valves will be closed. With couplings 26 and 37 coupled and valves in pipes 28 and 30 and valves 35, 24, and 18 being open, with valves in the bleed pipes 25 and 36 being closed, the system is ready for truck loading. When the pressure in the truck tank is lower than the pressure required to maintain the liquefied petroleum gas in a liquid state, flashing of the liquefied gas may occur in the meter 11. Throttle valves 19 and 32 remain closed until such time that pressure builds up sufficiently high in pipes 17 and 31 that meter 11 contains only liquid. With valve 40 in pipe 38 being open, the pressure controller 41 maintains valves 19 and 32 in a closed position until pressure builds up sufficiently high to prevent vaporization in meter 11. When this pressure is sufficiently high to maintain only liquid phase in the meter pressure controller 41 regulates control air or gas leaving the controller through pipe 48 to relay 45 to open valve 32 to some extent. Also, operating air or gas pressure passes through pipe 49 to the 3-way valve 20. When switch 104a is closed in the starting up operation, solenoid 21 is energized which actuates the 3-way valve 20 so that when operating air or gas pressure flows through pipe 49 this pressure passes directly through the 3-way valve to the motor of valve 19 to open the valve somewhat. With valves 19 and 32 open, liquid flows through valve 32 into the bottom of the tank while the liquid flowing through pipe 17 enters the top of the tank through pipe 29 in the form of a spray 8. If pressure in pipe 31 decreases to a value at which flashing can occur, the pressure controller 41 actuates valves 19 and 32 to a throttled position to increase the pressure in this pipe. Then when the pressure is properly increased, the controller opens valves 19 and 32 to full loading operation. In this manner the truck tank is loaded at the maximum rate.

Upon admission of liquid at a rapid rate into the bottom of the tank the gas or vapor phase above the liquid is compressed and thereby becomes warm. This warming obviously increases the pressure. The truck is pressure communicated through pipe 42, with valve 43 being opened, to the pressure controller 44. When the pressure in the truck tank reaches about 225 p.s.i.g. (pounds per square inch gauge), this pressure controller regulates control air or gas pressure from pipe 51 to pipe 50 and thence to air relay 45 in such a manner as to close the normally closed throttle valve 32. With valve 32 being closed the tank filling is finished through throttle valve 19 and pipe 29 as spray 8. This spraying of the liquid cools the vapor thereby reducing the pressure or at least preventing further pressure increase.

The desired gallonage of liquefied petroleum gas to be loaded into a truck tank has previously been set on the set-stop mechanism 12. This mechanism is such that when the metered gallonage has passed the meter the set-stop mechanism actuates switch 104a thereby opening same and by way of linkage 15 closes valve 14 to stop all flow of liquefied petroleum gas. With switch 104a open the circuit through solenoid 21 is open which actuates the 3-way valve 20 to vent the regulating gas pressure from throttle valve 19 thereby closing same.

When switch 104a has been opened by the set-stop mechanism having recorded the predetermined or preset number of gallons of liquid, the circuit is opened through motor starter 106 of pump 2 to stop the pump. However, if tank 27 becomes filled and switch 104a opens before such a time as tank 77 is filled, switch 112 remains closed thereby overriding opening in switch 104a. In this manner whichever tank becomes filled first opens its motor control switch but the other tank continues filling until it is completely filled to the desired gallonage. Thus, the motor starter 106 of pump 2 continues operation until all tanks on the line have been filled and all switches corresponding to switch 104a and switch 112 are open.

When tank 27 is filled, of course, the valve in pipes 28 and 30 are closed and valves 24 and 35 are closed while valves in pipes 25 and 36 are open to bleed pressure from pipes 23 and 34. When pressure is reduced in these latter pipes, the tank is uncoupled from the loading mechanism.

One difference between the apparatus for loading tank 27 and the apparatus for loading tank 77 is that a main control valve corresponding to valve 14 is not employed in the assembly for loading tank 77. The closing off of all loading to the tank 77 is controlled by motor valves 66 and 81. In this embodiment throttle valves 66 and 81, as mentioned hereinabove, are normally closed throttle valves and the liquefied gas to be loaded passes through all piping between the source and these normally closed throttle valves by its own vapor pressure. When couplings 76 and 86 have been made and all valves and connections properly made, hand lever 58 is pushed downward and mechanical linkage 59 actuates to close switches 112 and 113. The desired gallonage to be loaded into tank 77 has of course previously been set on the set-stop mechanism 57. Upon closing switch 112 the starter starts pump 2 and pressure in the pipes up to the throttle valves is increased. When switch 112 is closed the circuit through the solenoid 115 of solenoid valve 116 is actuated to regulate valve 116 so that fluid pressure may pass from pipe 56 to the motor of valve 81. With valve 63 in pipe 61 open, when pressure in pipe 60 becomes sufficiently high that all material to be pumped is in the liquid phase, particularly in meter 55, pressure controller 64 operates to pass control air or gas from pipe 93 through pipe 89 to air relay 65 for opening of throttle valve 66 and for passing control air or gas through pipe 56 and 3-way valve 116 to the motor of valve 81 for opening this valve. Since these valves 66 and 81 are throttle valves, they open to pass liquefied petroleum gas as long as sufficiently high pressure is maintained in pipe 60. If these valves were to open too far and allow a reduction of pressure in pipe 60 thereby causing possible flash vaporizing in meter 55, this low pressure actuates pressure controller 64 to close or to throttle the valves and thereby permit the building up of pressure in pipe 60. Thus, as long as pressure is sufficiently high in pipe 60 to prevent flash vaporizing in meter 55, throttle valves 66 and 81 remain open and the transport tank is filling. As mentioned above relative to transport tank 27, tank 77 is filled more rapidly through throttle valve 66 as liquid and a small fraction of the stream is passed through motor valve 81 for spraying into the top of the tank for cooling purposes. When the liquid is flowing into tank 77 quite rapidly, the vapor above the liquid becomes compressed and heated as mentioned above. This heating of the vapor increases its pressure and when this pressure reaches some predetermined relatively high pressure, as for example about 225 p.s.i.g., this pressure exists also in pipes 73 and 69, and with valve 70 being open the pressure controller 71 regulates the control air or gas from pipe 94 to pipe 90 to the air relay 65 to close throttle valve 66. With throttle valve 66 closed, the entire amount of liquefied petroleum gas entering tank 77 passes into the tank at the top thereof as spray 9. This spraying tends to cool the vapor in the tank thereby reducing the pressure. Since the total volume desired to be loaded into the tank has previously been set on the set-stop mechanism 57 this final loading is finished through spray pipe 88 until the final desired gallonage has been loaded into the tank.

However, if at any time this spraying of liquefied petroleum gas into the vapor phase of the tank cools the gases therein sufficiently to lower the pressure in the tank to a pressure below, for example, the above-mentioned selected pressure, that is 225 p.s.i.g., the pressure controller 71 actuates throttle valve 66 to open same and permit filling again of liquid into the bottom of the tank. Again, if pressure in the tank increases to a value above the desired pressure, pressure controller 71 closes valve 66 to permit final finishing of the tank through throttle valve 81 only.

In one embodiment the set-stop mechanism 57 may be selected from among those commercially available. Such a mechanism as herein intended is one of the type that when a predetermined gallonage has been admitted to the tank the set-stop mechanism is actuated to open switch 113 to close valve 66 and thereby allow flow only through valve 81. When this throttling device actuates to slow down the filling in this manner the tank filling operation has reached what may be described as the slow down period. The slow-down period or gallonage is set on the set-stop mechanism. In one case, the set-stop mechanism is set to open switch 113, thereby closing valve 66 when there is yet 100 gallons to be loaded. During this slow-down filling period valve 66 cannot open in any manner regardless of pressure within the tank. When the final desired gallonage has been metered through meter 55 the set-stop mechanism 57 actuates linkage 59 further to open switch 112 which then operates to open the circuit through solenoid 115, thereby venting control air or gas from the motor of throttle valve 81 thereby closing this valve. With switch 112 open the circuit 101, 121, switch 112, 111 and 102 through the pump starter 106 is open, the pump 2 stops with the result that the filling operation of tank 77 is ended. Upon closing the valves 74 and 84, and the valves in pipes 78 and 87, venting pressure from pipes 73 and 83 through pipes 75 and 85, and uncoupling the couplings 76 and 86, the transport truck is then ready for transport.

The strainers or filters 6 and 54 are installed in these systems for the purpose of preventing solid material from entering the meters, plugging the valves and for insuring delivery of clean product to the transport truck tank.

As mentioned hereinabove, one of the advantages of this system is that in either of the embodiments illustrated, that is, for filling tank 27 and for filling tank 77, the filling rate is reduced as the pressure approaches the pressure which might cause popping of the relief valves 91 and 92. It is obvious that in general vapors lost by popping of the relief valves are actually lost to the atmosphere. While such loss to the atmosphere may not be a serious economic loss, yet it represents a hazard in the immediate vicinity of the trucks. Another advantage of this invention is that when the desired gallonage has been loaded into the tanks the loading mechanism automatically closes off the charge pump to the operation. Furthermore, a particular advantage of this system is that sufficient pressure is maintained in the region of the meters 11 and 55 so that accurate positive displacement meters can be used. Such meters actually measure liquid volume passing through them for accurate measurement of liquid loaded into the truck tank. Since no pressure equalization lines are employed from the truck tank back to the storage tank the amount of liquid actually passed through meters 11 and 55 are the actual volumes of liquid loaded into the trucks.

While I have disclosed a positive displacement meter as the preferred type of meter for use as disclosed herein, other types of meters suitable for such service are used, if desired.

All the apparatus and equipment disclosed herein may be selected from among those commercially available taking into account corrosive nature of any liquefied gas being handled.

I have shown electric-pneumatic controls for my loading system. It will be readily apparent to those skilled in the art that the controls could be all electric, all pneumatic, all hydraulic or any combination of the same. The solenoid operators could easily be replaced by pneumatic or hydraulic operators. Similarly the diaphragm motors of the various valves could be replaced by electric or hydraulic valve operators. The pneumatic relays could be replaced by their electric or hydraulic equivalents.

The system disclosed herein is also used for loading other liquefied gases than liquefied petroleum gas, for example, liquid anhydrous ammonia.

While certain embodiments of the invention have been described for illustrative purposes, the invention obviously is not limited thereto.

I claim:

1. An apparatus for transferring a liquefied gas to a closed container comprising, in combination, a closed container for receiving the liquefied gas, a source of said liquefied gas, a first inlet for liquefied gas in the lower portion of said container, a second inlet for inlet of liquefied gas into the upper portion of said container, a first conduit communicating said source with said first inlet, a second conduit communicating said first conduit with said second inlet, a first throttle valve disposed operatively in said first conduit intermediate the point of juncture with said second conduit and said first inlet, a second throttle valve in said second conduit, a motor driven pump in said first conduit intermediate said source and the point of juncture with said second conduit for transferring liquefied gas to said container, a positive displacement meter in said first conduit intermediate said pump and the point of juncture with said second conduit, first means communicating with said first throttle valve for actuating same, said means being adapted to close said first throttle valve in response to a pressure greater than a predetermined pressure in said first conduit intermediate said first throttle valve and the container, and a second means communicating with said meter and with the motor of said pump, said second means being adapted to shut down said motor in response to passage of a predetermined volume of liquefied gas through said meter.

2. An apparatus for transferring a liquefied gas to a closed container comprising, in combination, a closed container for receiving the liquefied gas, a source of said liquefied gas, a first inlet for liquefied gas in the lower portion of said container, a second inlet for inlet of liquefied gas into the upper portion of said container, a first conduit communicating said source with said first inlet, a second conduit communicating said first conduit with said second inlet, a first throttle valve disposed operatively in said first conduit intermediate the point of juncture with said second conduit and said first inlet, a second throttle valve in said second conduit, a motor driven pump in said first conduit intermediate said source and the point of juncture with said second conduit for transferring liquefied gas to said container, a positive displacement meter in said first conduit intermediate said pump and the point of juncture with said second conduit, first means communicating with said first throttle valve for actuating same, said means being adapted to close said first throttle valve in response to a pressure greater than a predetermined pressure in said first conduit intermediate said first throttle valve and the container, a second means communicating with said meter and with said first means, said second means being adapted to actuate said first means to close said first throtle valve in response to passage of a predetermined volume of liquefied gas through said meter, and a third means communicating with said meter and with said second throttle valve, said third means being adapted to close said second throttle valve in response to passage of a predetermined volume of liquefied gas greater than the aforementioned predetermined volume.

3. In the apparatus of claim 2, said third means also being in communication with the motor of said pump and being adapted to close off said motor in response to passage of said predetermined volume of liquefied gas greater than said aforementioned predetermined volume.

4. An apparatus for transferring a liquefied gas to a closed container comprising, in combination, a closed container for receiving the liquefied gas, a source of said liquefied gas, a first inlet for inlet of liquefied gas in the lower portion of said container, a second inlet for inlet of liquefied gas into the upper portion of said container, a first conduit communicating said source with said first inlet, a second conduit communicating said first conduit with said second inlet, a first throttle valve disposed operatively in said first conduit intermediate the point of juncture with said second conduit and said first inlet, a second throttle valve in said second conduit, a motor driven pump in said first conduit intermediate said source and said point of juncture for transferring liquefied gas to said container, a positive displacement meter in said first conduit intermediate said pump and said point of juncture, an on-off valve in said first conduit intermediate said meter and said point of juncture, first means in communication with said first throttle valve for actuating same, said first means being adapted to close said first throttle valve in response to a pressure greater than a predetermined pressure in said first conduit on the side of said throttle valve nearest said first container, and a second means in communication with said on-off valve for actuating same, said second means being adapted to close said on-off valve in response to passage of a predetermined volume of liquefied gas through said meter.

5. In the apparatus of claim 4, a third means in operative communication with said second means and with the motor of said pump, said second means also being adapted to actuate said third means in response to passage of said predetermined volume of liquefied gas through said meter whereby the motor of said pump is closed off.

6. In the apparatus of claim 4, a third means in communication with said first and second throttle valves for actuating same, said third means being adapted to throttle said first and second throttle valves in response to a pressure below a second predetermined pressure in said first conduit intermediate said point of juncture and said first throttle valve.

7. An apparatus for transferring a liquefied gas simultaneously to a first closed container and to a second closed container, a source of said liquefied gas, a separate inlet for liquefied gas in each container, a first conduit communicating said source with said inlet in said first container, a second conduit communicating said first conduit with the inlet in said second container, a motor driven pump in said first conduit intermediate said source and the point of juncture of said second conduit with said first conduit, a source of motive power communicating with the motor of said pump, a first positive displacement meter in said first conduit intermediate said point of juncture and the inlet to said first container, a first valve in said first conduit intermediate said first meter and said inlet in said first container, a first means communicating with said first valve for actuating same, a second means communicating with said first means and with said source of motive power, said first means being adapted to close said first valve in response to passage of a predetermined volume of liquefied gas through said first meter, and said second means being adapted to shut off said source of motive power to the motor of said pump in response to passage of said predetermined volume of liquefied gas through said first meter; a second positive displacement meter in said second conduit, a second valve in said second conduit intermediate said second meter and the inlet in said second container, a third means communicating with said second valve for actuating same, a fourth means communicating with said third means and said source of motive power, said third means being adapted to close said second valve in response to passage of a predetermined volume of liquefied gas through said second meter, and said fourth means being adapted to shut off said source of motive power to the motor of said pump in response to passage of said predetermined volume of liquefied gas through said second meter, said fourth means also being adapted to shut off the source of said motive power only following actuation of said second means shutting off said source of motive power.

References Cited in the file of this patent

UNITED STATES PATENTS

| | | |
|---|---|---|
| 2,362,724 | Shea | Nov. 14, 1944 |
| 2,368,215 | Hanson | Jan. 30, 1945 |
| 2,728,196 | Bowser | Dec. 27, 1955 |